united States Patent [15] 3,686,371
Hasegawa [45] Aug. 22, 1972

[54] METHOD FOR PRODUCING COPOLYMERIZABLE COMPOUND CONTAINING FUNCTIONAL GROUP OF PHOSPHORIC ACID

[72] Inventor: Tadashi Hasegawa, 5-14, Kiyosu, Sagiyama, Gifu, Japan

[22] Filed: May 22, 1969

[21] Appl. No.: 827,067

[52] U.S. Cl. ..........260/980, 260/85.5 R, 260/86.1 E
[51] Int. Cl. ................................................C07f 9/08
[58] Field of Search..............................260/980, 974

[56] References Cited

UNITED STATES PATENTS 2,745,863   5/1956   Otto .........................260/980

3,331,896   7/1967   Eiseman et al. ...........260/980

*Primary Examiner*—Joseph Rebold
*Assistant Examiner*—Richard L. Raymond
*Attorney*—Fred C. Philpitt

[57] ABSTRACT

A copolymerizable monomer containing a functional group of a phosphoric acid is prepared by reacting a monomeric compound containing a hydroxyl radical and an unsaturated double bond with phosphorus pentaoxide by dropping 1 mole of phosphorus pentaoxide into at least 1.8 moles of the monomeric compound at a liquid temperature from 20° to 100°C and then adding at least 1 mole of water.

3 Claims, No Drawings

METHOD FOR PRODUCING COPOLYMERIZABLE COMPOUND CONTAINING FUNCTIONAL GROUP OF PHOSPHORIC ACID

DESCRIPTION

This invention relates to a method for producing copolymerizable monomer containing a phosphoric acid.

With regard to synthetic methods of copolymerizable ester of phosphoric acid, there have been heretofore known methods which rely on the reaction of an alcohol containing unsaturated double bond with phosphorus oxychloride phosphorus pentaoxide. However, in such methods, depending upon reaction conditions, side reactions which form diester or triester of phosphoric acid containing two or three unsaturated double bonds relative to one phosphoric acid radical tend to occur. When a monomeric ester of phosphoric acid containing such di- or triester is used, gelation occurs during the copolymerization reaction with another monomer and the production of stable copolymer becomes difficult.

Accordingly, it is an object of the present invention to provide a method for producing a copolymerizable monoester of phosphoric acid with a high grade of product purity. It is another object of the present invention to provide a method for producing a comonomer ester of phosphoric acid which polymerizes with another vinyl or acrylic monomer easily without causing gelation during the polymerization reaction.

It has now been discovered by the present inventor that the above-mentioned objects can be attained by the method of the present invention which comprises dropping 1 mol of phosphorus pentaoxide into 1.8 mol or more of a monomeric compound containing a hydroxyl radical and an unsaturated double bond at a liquid phase temperature ranging from 20° to 100°C and then adding 1 mol or more of water to complete the reaction.

The reason that the amount of a monomer containing a hydroxyl radical and an unsaturated double bond is limited to 1.8 mol or more relative to 1 mol of phosphorus pentaoxide and the temperature of reaction to a point higher than 20°C and lower than 100°C lies in obtaining only copolymerizable monoester of phosphoric acid with a high product purity. Namely these limitations are indispensable conditions to attain the object of the present invention. When the temperature is higher than 100°C, the resultant monomer becomes uncopolymerizable due to the polymerization of monomer itself or the addition to the unsaturated double bond. When the amount of a monomer containing a hydroxyl radical and an unsaturated double bond is less than 1.8 mol relative to a mol of phosphorus pentaoxide, the resultant monomer not only contains unreacted phosphoric acid which is difficult to remove but also monomeric compounds of di- or triester which are the cause of gelation during the copolymerization are produced.

Further the order of addition is important in the present method. If a monomer containing a hydroxy radical and an unsaturated double bond is added to phosphorus pentaoxide as carried out usually in conventional methods, due to violent exothermic reaction, the side reactions of diester or triester formation, polymerization reaction, condensation or the like occur and a monomer of monoester of phosphoric acid having such a high purity as that of the present invention cannot be obtained.

The monomeric compounds containing a hydroxyl radical and an unsaturated double bond include 2-hydroxyethyl methacrylate, 2-hydroxyethyl acrylate, allyl alcohol, etc.

Following examples are offered by way of illustration but not by way of limitation.

EXAMPLE 1

2 mols of 2-hydroxyethyl methacrylate (260 g.) were charged in a flask equipped with a stirrer and a cooler. To the system whose liquid temperature was adjusted always to 60°C by a heater and a cooler, 1 mol of phosphorus pentaoxide (140 g.) was dropped by dividing it into 5 portions at an interval of 30 minutes. After continuation of reaction at the same temperature, 1 mol of water (18 g) was added and reaction was continued for further 2 hours.

Monophosphoric acid ester of 2-hydroxyethyl methacrylate could be copolymerized with another acrylic monomer in a solvent of alcohol types without any gelation when tested by using methyl methacrylate, methyl acrylate and acrylonitrile as another acrylic monomer.

EXAMPLE 2

2.5 mols of allyl alcohol (145 g.) was charged in a flask equipped with a stirrer and a cooler. To the system whose liquid temperature was adjusted always to 40°C by a heater and a cooler, 1 mol of phosphor pentaoxide (140 g.) was dropped continuously over 2 hours. After continuation of reaction for further 2 hours at the same temperature, 1 mol of water (18 g.) was charged and the reaction was continued for 2 hours at a temperature of 80°C.

The monophosphoric ester of allyl alcohol thus obtained could be copolymerized with another acrylic monomer (tested with ethyl acrylate, methyl methacrylate and acrylonitrile) in a solvent of alcohol type easily without forming gal.

The copolymers obtained by the copolymerization of acrylic monomers with monophosphoric acid esters of 2-hydroxyethyl methacrylate, allyl alcohol, etc. afford coating compositions having superiority in anti-corrosion, excellent adhesion, fire-retarding and low temperature curing.

What is claimed is:

1. A method for producing a copolymerizable monomeric monoester of phosphoric acid having a phosphoric acid group and an unsaturated double bond which comprises dropping 1 mole of phosphorus pentaoxide into at least 1.8 moles of a monomeric compound having a hydroxyl radical and an unsaturated double bond selected from the group of 2-hydroxy ethyl methacrylate, 2-hydroxy ethyl acrylate, and allyl alcohol at a temperature ranging from 20° to 100°C and then adding at least 1 mole of water.

2. A method of claim 1 wherein a monomeric compound having a hydroxyl radical and an unsaturated double bond is 2-hydroxyethyl methacrylate.

3. A method of claim 1 wherein a monomeric compound having a hydroxyl radical and an unsaturated double bond is allyl alcohol.

* * * * *